United States Patent [19]

O'Brien et al.

[11] Patent Number: 5,247,638

[45] Date of Patent: Sep. 21, 1993

[54] APPARATUS FOR COMPRESSING DATA IN A DYNAMICALLY MAPPED VIRTUAL DATA STORAGE SUBSYSTEM

[75] Inventors: John T. O'Brien, Louisville; George A. Rudeseal, Boulder; Charles A. Milligan, Golden; Craig A. Buhlman, Boulder, all of Colo.

[73] Assignee: Storage Technology Corporation, Louisville, Colo.

[21] Appl. No.: 540,219

[22] Filed: Jun. 18, 1990

[51] Int. Cl.$^5$ ............... G06F 12/00; G06F 12/10; G06F 11/16; H03M 7/30

[52] U.S. Cl. .................. 395/425; 395/575; 341/87

[58] Field of Search ............... 395/425, 575; 341/87; 371/10.1, 8.1, 37.1

[56] References Cited

U.S. PATENT DOCUMENTS

| | | | |
|---|---|---|---|
| 4,467,421 | 8/1984 | White | 395/425 |
| 4,476,526 | 10/1984 | Dodd | 395/425 |
| 4,780,808 | 10/1988 | Moreno et al. | 395/800 |
| 4,797,755 | 1/1989 | Baldwin et al. | 395/425 X |
| 4,914,656 | 4/1990 | Dunphy, Jr. et al. | 395/525 X |
| 4,929,946 | 5/1990 | O'Brien et al. | 341/87 |
| 4,989,205 | 9/1991 | Dunphy, Jr. et al. | 395/575 X |
| 5,072,378 | 12/1991 | Manka | 395/575 |
| 5,124,987 | 6/1992 | Milligan et al. | 371/10.1 |

FOREIGN PATENT DOCUMENTS 0294287 12/1988 European Pat. Off. .
0328240 8/1989 European Pat. Off. .
0347032 12/1989 European Pat. Off. .

OTHER PUBLICATIONS

IBM Technical Disclosure Bulletin, "Data Converter For Different Size Data Sectors in a DASD of a Computer" vol. 28, No. 2, Jul. '85, pp. 525-528.

Fujita et al. "H-6485 Magnetic Tape Subsystem" Hitachi Review, vol. 36, No. 4 Aug. 87, pp. 193-200.

Welch, Sperry Research Center; "A Technique for High-Performance Data Compression"; Jun. 1984; pp. 8-19.

Primary Examiner—Joseph L. Dixon
Assistant Examiner—Michael A. Whitfield
Attorney, Agent, or Firm—Duft, Graziano & Forest

[57] ABSTRACT

The use of a dynamically mapped virtual memory system permits the storage of data so that each data record occupies only the physical space required for the data. Furthermore, the data storage subsystem manages the allocation of physical space on the disk drives and does not rely on the file extent defined in the count key data format. Data compaction apparatus is provided to remove the gaps contained in the stream of count key data records received from the host processor. A data compression algorithm is then used to compress the received data into a compressed format for storage on the disk drives. It is the compacted, compressed data that is finally stored on the disk drives. Furthermore, any data record received from the host processor absent data in the user data field therein is simply listed in the virtual memory map as a null field occupying no physical space on the disk drives. The data storage control, through its mapping capability, stores the actual data in the minimum physical space required by overcoming the limitations imposed on large form factor disk drives by the use of count key data format data records. However, the data storage subsystem returns this stored data to the host processor in count key data format through a data record reformatting process once the stored compacted compressed data is staged to the cache memory for access by the host processor. The data storage subsystem is operationally independent of the host processor, yet performs as if it were a standard operationally dependent large form factor disk subsystem.

43 Claims, 4 Drawing Sheets

APPARATUS FOR COMPRESSING DATA IN A DYNAMICALLY MAPPED VIRTUAL DATA STORAGE SUBSYSTEM

CROSS-REFERENCE TO RELATED APPLICATIONS

This patent application is related to application Ser. No. 07/308,767 entitled Adaptive Data Compression Apparatus for a Tape Drive System, filed Feb. 9, 1988 now U.S. Pat. No. 4,929,946, and application Ser. No. 07/509,484, now U.S. Pat. No. 5,124,987 entitled Logical Track Write Scheduling System for a Parallel Disk Drive Array Data Storage Subsystem, filed Apr. 16, 1990.

FIELD OF THE INVENTION

This invention relates to data storage subsystems and, in particular, to a dynamically mapped virtual data storage subsystem that uses a plurality of data compression techniques to minimize the amount of unused data storage capacity on disk drives in a count key data environment.

PROBLEM

It is a problem in the field of data storage subsystems to efficiently use the maximum amount of physical data storage capacity available on data storage devices, especially in the count key data environment. As defined in the document entitled "IBM Storage Subsystem Library, IBM 3390 Direct Access Storage Introduction" GC26-4573 large capacity data storage subsystems, such as disk storage devices, are typically interconnected with large or intermediate size computers to provide the data storage capability required by these computers. These large and intermediate size computers generally run IBM operating systems, such as MVS, VM, TPF, which make use of a count key data format for data storage purposes. These operating systems not only control the formatting of the data that is stored on the disk storage devices but also control the allocation of data storage space on the disk storage devices.

In this environment, the implementation of data compression requires that the computer perform the data compression operation. This is because data compression, by its very nature, has an efficiency that varies with the content of the data record that is to- be compressed. Thus, the computer can not allocate data storage space on the disk storage devices unless it performs a data compression operation since the size of each data record of the compressed data file is unknown until the completion of the data compression operation. The implementation of the data compression function on the computer itself is inadvisable because of the amount of processor time required to perform the data compression function. In systems that do implement data compression on the host computer, the data compression function is selectively applied, for example, to large data files that are to be archived. Compressing each file that is stored on the disk storage devices would consume too much processing capability and would also cause access delays.

Another problem with this architecture is that a significant amount of physical space on the associated disk drives is not utilized due to a number of factors inherent in the use of the count key data format. One of these factors is that each data file is written to a designated set of tracks on the disk drive, typically resulting in a segment of the last track of the set being unused by this data file. This resultant unused space is unavailable for use by the host processor to store another data file. Therefore, a significant percentage of the physical data storage capacity of the disk drive is unusable due to these per track "scraps" of media.

Another factor in under-utilization of disk drive capacity is the reservation of data storage capacity for empty data records. Each time the host processor allocates disk space for a data file a predetermined number of tracks called an extent is reserved on the disk drive for future storage of data. There is presently no capability to release these unused reserved data record areas on the disk drive until the host processor expunges the created, unused set of tracks. Additionally, count key data records contain gaps between the various fields of the data record, and between successive data records, which again constitute unused physical storage capacity on the disk drive.

SOLUTION

The above described problems are solved and a technical advance achieved in the field by the apparatus to compress data in a dynamically mapped virtual data storage subsystem of the present invention. This apparatus uses a plurality of techniques to minimize the physical space required to store count key data format data records and to minimize the amount of physical space on the disk drives that is unusable by the host processor. This apparatus performs an outboard data compression operation thereby eliminating the need for the host computer to perform the data compression operation. This data compression apparatus is located in the data path between the host computer and the cache of a fully buffered cached disk storage subsystem. This data storage subsystem does not support synchronous data transfers between host computer and the disk storage devices. Instead, the data storage system presents the image of count key data disk storage devices to the host computer system while actually using fixed block architecture real disk storage devices. The data storage system performs a dynamic time varying mapping of the count key data virtual image presented to the host computer onto the fixed block architecture of the actual disk storage devices. Thus, the data storage system performs the actual data storage space allocation which allocation takes place subsequent to the data compression operation on each written data record.

This architecture completely eliminates the involvement of the host computer in the data compression and physical disk space allocation processes. The host computer operates in traditional fashion, by transmitting stream of data records in count key data format via a data channel to the data storage system. The host computer also allocates virtual memory space and transmits the virtual address along with each stream of data records to the data storage system. The data storage system emulates a count key data storage system and, in response to the receipt of this information from the host computer, performs a data compression operation on each data record of the received stream of data records. Once the data records have been compressed, the data storage system maps the assigned memory location and the new size of the compressed stream of data records into an actual memory location on the fixed block architecture disk storage devices. Similarly, the data storage system, in response to a data record read request received from the host processor, retrieves the compressed data record from the memory location assigned by the data storage system and decompresses this record into a count key data format for transmission to the requesting host computer. This architecture thereby enables every data record stored in the data storage system to be compressed without requiring the host computer to perform the data compression operation. The data storage system also eliminates the problem of memory space allocation by performing a dynamic virtual mapping of the original memory allocation performed by the host computer combined with the reduced size of the compressed data records into a new target memory address representative of the real location of the compressed data record on the disk storage devices. This enables the data storage system to perform with the advantages of the traditional cached count key data buffered transfers with the additional advantage of reduced memory requirements due to the implementation of data compression on the data storage system.

The data storage subsystem of the present invention uses a plurality of small form factor disk drives in place of a single large form factor disk drive to implement an inexpensive, high performance, high reliability disk drive memory that emulates the format and capability of large form factor disk drives.

The plurality of disk drives in the parallel disk drive array data storage subsystem are configured into a plurality of variable size redundancy groups of N+M parallel connected disk drives to store data thereon. Each redundancy group, also called a logical disk drive, is divided into a number of logical cylinders, each containing i logical tracks, one logical track for each of the i physical tracks contained in a cylinder of one physical disk drive. Each logical track is comprised of N+M physical tracks, one physical track from each disk drive in the redundancy group. The N+M disk drives are used to store N data segments, one on each of N physical tracks per logical track, and to store M redundancy segments, one on each of M physical tracks per logical track in the redundancy group. The N+M disk drives in a redundancy group have unsynchronized spindles and loosely coupled actuators. The data is transferred to the disk drives via independent reads and writes since all disk drives operate independently. Furthermore, the M redundancy segments, for successive logical cylinders, are distributed across all the disk drives in the redundancy group rather than using dedicated redundancy disk drives.

The parallel disk drive array data storage subsystem includes a data storage management system that provides improved data storage and retrieval performance by dynamically mapping between virtual and physical data storage devices. The parallel disk drive array data storage subsystem consists of three abstract layers: virtual, logical and physical. The virtual layer functions as a conventional large form factor disk drive memory. The logical layer functions as an array of storage units that are grouped into a plurality of redundancy groups, each containing N+M physical disk drives. The physical layer functions as a plurality of individual small form factor disk drives. The data storage management system operates to effectuate the dynamic mapping of data among these abstract layers and to control the allocation and management of the actual space on the physical devices. These data storage management functions are performed in a manner that renders the operation of the parallel disk drive array data storage subsystem transparent to the host processor which perceives only the virtual image of the disk drive array data storage subsystem.

The use of a dynamically mapped virtual memory system permits the storage of data in the redundancy groups in fixed block format so that the data record occupies only the physical space required for the data. Furthermore, the data storage subsystem manages the allocation of physical space on the disk drives of each redundancy group and does not rely on the file extent defined in the count key data format. A data compression algorithm is used to compress the received data into a compressed format for storage on the disk drives. Data compaction apparatus is provided to remove the gaps contained in the count key data record received from the host processor. It is the compressed, compacted data that is finally stored on the disk drives in the redundancy group. Furthermore, any virtual track received from the host processor absent data in the data records thereof is simply listed in the virtual memory map as a null or unformatted track occupying no physical space on the disk drives in the redundancy groups. The data storage control, through its mapping capability, stores the actual data in the minimum physical space required by overcoming the limitations imposed on large form factor disk drives by the use of count key data format data records. However, the data storage subsystem returns this stored data to the host processor in count key data format through a data record reformatting process once the stored compressed compacted data is staged to the cache memory for access by the host processor. The data storage subsystem is operationally independent of the host processor, yet performs as if it were a standard operationally dependent large form factor disk drive.

DETAILED DESCRIPTION OF THE DRAWING

Figure 1:
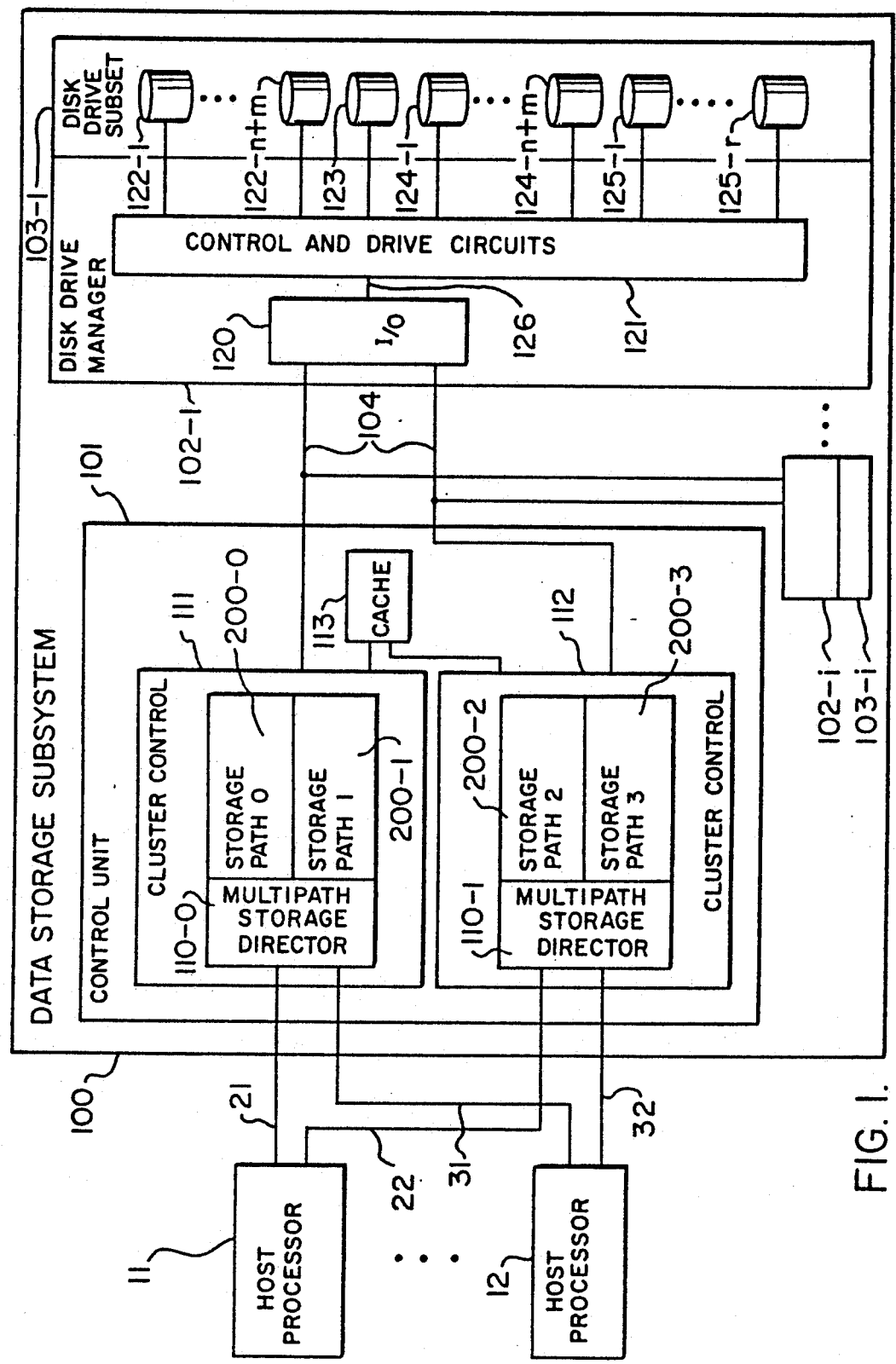
FIG. 1 illustrates in block diagram form the architecture of the parallel disk drive array data storage subsystem.

The data storage subsystem of the present invention uses a plurality of small form factor disk drives in place of a single large form factor disk drive to implement an inexpensive, high performance, high reliability disk drive memory that emulates the format and capability of large form factor disk drives. The plurality of disk drives in the parallel disk drive array data storage subsystem are configured into a plurality of variable size redundancy groups of N+M parallel connected disk drives to store data thereon. Each redundancy group, also called a logical disk drive, is divided into a number of logical cylinders, each containing i logical tracks, one logical track for each of the i physical tracks contained in a cylinder of one physical disk drive. Each logical track is comprised of N+M physical tracks, one physical track from each disk drive in the redundancy group. The N+M disk drives are used to store N data segments, one on each of N physical tracks per logical track, and to store M redundancy segments, one on each of M physical tracks per logical track in the redundancy group. The N+M disk drives in a redundancy group have unsynchronized spindles and loosely coupled actuators. The data is transferred to the disk drives via independent reads and writes since all disk drives operate independently. Furthermore, the M redundancy segments, for successive logical cylinders, are distributed across all the disk drives in the redundancy group rather than using dedicated redundancy disk drives. The redundancy segments are distributed so that every actuator in a redundancy group is used to access some of the data segments stored on the disk drives. If dedicated drives were provided for redundancy segments, then these disk drives would be inactive unless redundancy segments were being read from or written to these drives. However, with distributed redundancy, all actuators in a redundancy group are available for data access. In addition, a pool of R globally switchable backup disk drives is maintained in the data storage subsystem to automatically substitute a replacement disk drive for a disk drive in any redundancy group that fails during operation. The pool of R backup disk drives provides high reliability at low cost.

Each physical disk drive is designed so that it can detect a failure in its operation, which allows the M redundancy segments per logical track to be used for multi-bit error correction. Identification of the failed physical disk drive provides information on the bit position of the errors in the logical track and the redundancy data provides information to correct the errors. Once a failed disk drive in a redundancy group is identified, a backup disk drive from the shared pool of backup disk drives is automatically switched in place of the failed disk drive. Control circuitry reconstructs the data stored on each physical track of the failed disk drive, using the remaining N−1 physical tracks of data plus the associated M physical tracks containing redundancy segments of each logical track. A failure in the redundancy segments does not require data reconstruction, but necessitates regeneration of the redundancy information. The reconstructed data is then written onto the substitute disk drive. The use of backup disk drives increases the system reliability of the N+M parallel disk drive architecture while the use of a shared pool of backup disk drives minimizes the cost of providing the improved reliability.

The parallel disk drive array data storage subsystem includes a data storage management system that provides improved data storage and retrieval performance by dynamically mapping between virtual and physical data storage devices. The parallel disk drive array data storage subsystem consists of three abstract layers: virtual, logical and physical. The virtual layer functions as a conventional large form factor disk drive memory. The logical layer functions as an array of storage units that are grouped into a plurality of redundancy groups, each containing N+M physical disk drives. The physical layer functions as a plurality of individual small form factor disk drives. The data storage management systems operates to effectuate the dynamic mapping of data among these abstract layers and to control the allocation and management of the actual space on the physical devices. These data storage management functions are performed in a manner that renders the operation of the parallel disk drive array data storage subsystem transparent to the host processor which perceives only the virtual image of the disk drive array data storage subsystem.

The performance of this system is enhanced by the use of a cache memory with both volatile and nonvolatile portions and "backend" data staging and destaging processes. Data received from the host processors is stored in the cache memory in the form of modifications to data already stored in the redundancy groups of the data storage subsystem. No data stored in a redundancy group is modified. A virtual track is staged from a redundancy group into cache. The host then modifies some, perhaps all, of the records on the virtual track. Then, as determined by cache replacement algorithms such as Least Recently Used, etc., the modified virtual track is selected to be destaged to a redundancy group. When thus selected, a virtual track is divided (marked off) into several physical sectors to be stored on one or more physical tracks of one or more logical tracks. A complete physical track may contain physical sectors from one or more virtual tracks. Each physical track is combined with N-1 other physical tracks to form the N data segments of a logical track.

The original, unmodified data is simply flagged as obsolete. Obviously, as data is modified, the redundancy groups increasingly contain numerous virtual tracks of obsolete data. The remaining valid virtual tracks in a logical cylinder are read to the cache memory in a background "free space collection" process. They are then written to a previously emptied logical cylinder and the "collected" logical cylinder is tagged as being empty. Thus, all redundancy data creation, writing and free space collection occurs in background, rather than on-demand processes. This arrangement avoids the parity update problem of existing disk array systems and improves the response time versus access rate performance of the data storage subsystem by transferring these overhead tasks to background processes.

Data Storage Subsystem Architecture

FIG. 1 illustrates in block diagram form the architecture of the preferred embodiment of the parallel disk drive array data storage subsystem 100. The parallel disk drive array data storage subsystem 100 appears to the associated host processors 11-12 to be a collection of large form factor disk drives with their associated storage control, since the architecture of parallel disk drive array data storage subsystem 100 is transparent to the associated host processors 11-12. This parallel disk drive array data storage subsystem 100 includes a plurality of disk drives (ex 122-1 to 125-r) located in a plurality of disk drive subsets 103-1 to 103-i. The disk drives 122-1 to 125-r are significantly less expensive, even while providing disk drives to store redundancy information and providing disk drives for backup purposes, than the typical 14 inch form factor disk drive with an associated backup disk drive. The plurality of disk drives 122-1 to 125-r are typically the commodity hard disk drives in the 5¼ inch form factor.

The architecture illustrated in FIG. 1 is that of a plurality of host processors 11-12 interconnected via the respective plurality of data channels 21, 22-31, 32, respectively to a data storage subsystem 100 that provides the backend data storage capacity for the host processors 11-12. This basic configuration is well known in the data processing art. The data storage subsystem 100 includes a control unit 101 that serves to interconnect the subsets of disk drives 103-1 to 103-i and their associated drive managers 102-1 to 102-i with the data channels 21-22, 31-32 that interconnect data storage subsystem 100 with the plurality of host processors 11, 12.

Control unit 101 includes typically two cluster controls 111, 112 for redundancy purposes. Within a cluster control 111 the multipath storage director 110-0 provides a hardware interface to interconnect data channels 21, 31 to cluster control 111 contained in control unit 101. In this respect, the multipath storage director 110-0 provides a hardware interface to the associated data channels 21, 31 and provides a multiplex function to enable any attached data channel ex-21 from any host processor ex-11 to interconnect to a selected cluster control 111 within control unit 101. The cluster control 111 itself provides a pair of storage paths 201-0, 201-1 which function as an interface to a plurality of optical fiber backend channels 104. In addition, the cluster control 111 includes a data compression function as well as a data routing function that enables cluster control 111 to direct the transfer of data between a selected data channel 21 and cache memory 113, and between cache memory 113 and one of the connected optical fiber backend channels 104. Control unit 101 provides the major data storage subsystem control functions that include the creation and regulation of data redundancy groups, reconstruction of data for a failed disk drive, switching a spare disk drive in place of a failed disk drive, data redundancy generation, logical device space management, and virtual to logical device mapping. These subsystem functions are discussed in further detail below.

Disk drive manager 102-1 interconnects the plurality of commodity disk drives 122-1 to 125-r included in disk drive subset 103-1 with the plurality of optical fiber backend channels 104. Disk drive manager 102-1 includes an input/output circuit 120 that provides a hardware interface to interconnect the optical fiber backend channels 104 with the data paths 126 that serve control and drive circuits 121. Control and drive circuits 121 receive the data on conductors 126 from input/output circuit 120 and convert the form and format of these signals as required by the associated commodity disk drives in disk drive subset 103-1. In addition, control and drive circuits 121 provide a control signalling interface to transfer signals between the disk drive subset 103-1 and control unit 101.

The data that is written onto the disk drives in disk drive subset 103-1 consists of data that is transmitted from an associated host processor 11 over data channel 21 to one of cluster controls 111, 112 in control unit 101. The data is written into, for example, cluster control 111 which stores the data in cache 113. Cluster control 111 stores N physical tracks of data in cache 113 and then generates M redundancy segments for error correction purposes. Cluster control 111 then selects a subset of disk drives (122-1 to 122-n+m) to form a redundancy group to store the received data. Cluster control 111 selects an empty logical track, consisting of N+M physical tracks, in the selected redundancy group. Each of the N physical tracks of the data are written onto one of N disk drives in the selected data redundancy group. An additional M disk drives are used in the redundancy group to store the M redundancy segments. The M redundancy segments include error correction characters and data that can be used to verify the integrity of the N physical tracks that are stored on the N disk drives as well as to reconstruct one or more of the N physical tracks of the data if that physical track were lost due to a failure of the disk drive on which that physical track is stored.

Thus, data storage subsystem 100 can emulate one or more large form factor disk drives (ex—an IBM 3380K type of disk drive) using a plurality of smaller form factor disk drives while providing a high reliability capability by writing the data across a plurality of the smaller form factor disk drives. A reliability improvement is also obtained by providing a pool of R backup disk drives (125-1 to 125-r) that are switchably interconnectable in place of a failed disk drive. Data reconstruction is accomplished by the use of the M redundancy segments, so that the data stored on the remaining functioning disk drives combined with the redundancy information stored in the redundancy segments can be used by control software in control unit 101 to reconstruct the data lost when one or more of the plurality of disk drives in the redundancy group fails (122-1 to 122-n+m). This arrangement provides a reliability capability similar to that obtained by disk shadowing arrangements at a significantly reduced cost over such an arrangement.

Disk Drive

Each of the disk drives 122-1 to 125-r in disk drive subset 103-1 can be considered a disk subsystem that consists of a disk drive mechanism and its surrounding control and interface circuitry. The disk drive consists of a commodity disk drive which is a commercially available hard disk drive of the type that typically is used in personal computers. A control processor associated with the disk drive has control responsibility for the entire disk drive and monitors all information routed over the various serial data channels that connect each disk drive 122-1 to 125-r to control and drive circuits 121. Any data transmitted to the disk drive over these channels is stored in a corresponding interface buffer which is connected via an associated serial data channel to a corresponding serial/parallel converter circuit. A disk controller is also provided in each disk drive to implement the low level electrical interface required by the commodity disk drive. The commodity disk drive has an ESDI interface which must be interfaced with control and drive circuits 121. The disk controller provides this function. Disk controller provides serialization and deserialization of data, CRC/ECC generation, checking and correction and NRZ data encoding. The addressing information such as the head select and other type of control signals are provided by control and drive circuits 121 to commodity disk drive 122-1. This communication path is also provided for diagnostic and control purposes. For example, control and drive circuits 121 can power a commodity disk drive down when the disk drive is in the standby mode. In this fashion, commodity disk drive remains in an idle state until it is selected by control and drive circuits 121.

Control Unit

Figure 2:
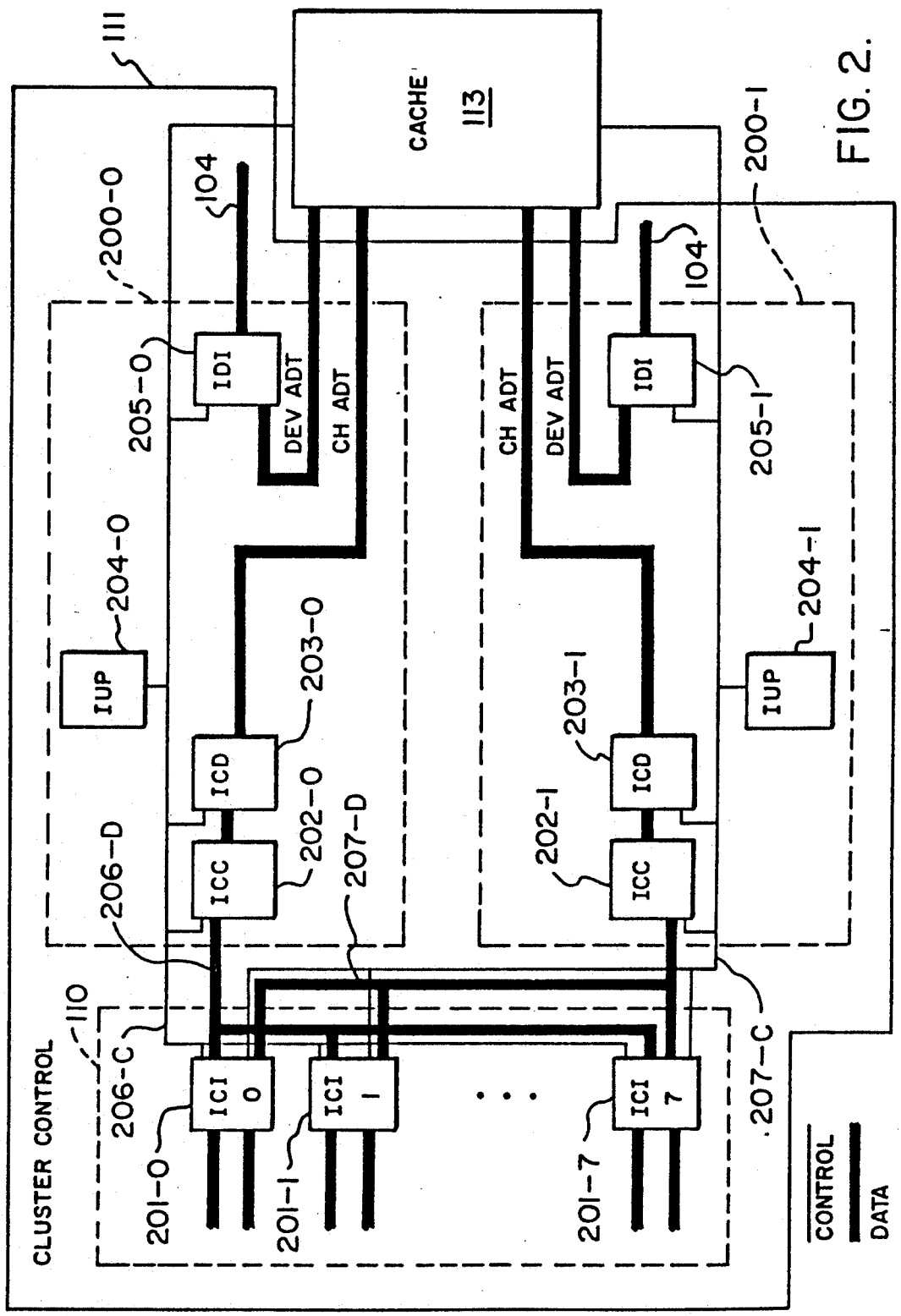
FIG. 2 illustrates the cluster control of the data storage subsystem.

FIG. 2 illustrates in block diagram form additional details of cluster control 111. Multipath storage director 110 includes a plurality of channel interface units 201-0 to 201-7, each of which terminates a corresponding pair of data channels 21, 31. The control and data signals received by the corresponding channel interface unit 201-0 are output on either of the corresponding control and data buses 206-C, 206-D, or 207-C, 207-D, respectively, to either storage path 200-0 or storage path 200-1. Thus, as can be seen from the structure of the cluster control 111 illustrated in FIG. 2, there is a significant amount of symmetry contained therein. Storage path 200-0 is identical to storage path 200-1 and only one of these is described herein. The multipath storage director 110 uses two sets of data and control busses 206-D, C and 207-D, C to interconnect each channel interface unit 201-0 to 201-7 with both storage path 200-0 and 200-1 so that the corresponding data channel 21 from the associated host processor 11 can be switched via either storage path 200-0 or 200-1 to the plurality of optical fiber backend channels 104. Within storage path 200-0 is contained a processor 204-0 that regulates the operation of storage path 200-0. In addition, an optical device interface 205-0 is provided to convert between the optical fiber signalling format of optical fiber backend channels 104 and the metallic conductors contained within storage path 200-0. Channel interface control 202-0 operates under control of processor 204-0 to control the flow of data to and from cache memory 113 and one of the channel interface units 201 that is presently active with storage path 200-0. The channel interface control 202-0 includes a cyclic redundancy check (CRC) generator/checker to generate and check the CRC bytes for the received data. The channel interface circuit 202-0 also includes a buffer that compensates for speed mismatch between the data transmission rate of the data channel 21 and the available data transfer capability of the cache memory 113. The data that is received by the channel interface control circuit 202-0 from a corresponding channel interface circuit 201 is forwarded to the cache memory 113 via channel data compression circuit 203-0. The channel data compression circuit 203-0 provides the necessary hardware and microcode to perform compression of the channel data for the control unit 101 on a data write from the host processor 11. It also performs the necessary decompression operation for control unit 101 on a data read operation by the host processor 11.

As can be seen from the architecture illustrated in FIG. 2, all data transfers between a host processor 11 and a redundancy group in the disk drive subsets 103 are routed through cache memory 113. Control of cache memory 113 is provided in control unit 101 by processor 204-0. The functions provided by processor 204-0 include initialization of the cache directory and other cache data structures, cache directory searching and management, cache space management, cache performance improvement algorithms as well as other cache control functions. In addition, processor 204-0 creates the redundancy groups from the disk drives in disk drive subsets 103 and maintains records of the status of those devices. Processor 204-0 also causes the redundancy data across the N data disks in a redundancy group to be generated within cache memory 113 and writes the M segments of redundancy data onto the M redundancy disks in the redundancy group. The functional software in processor 204-0 also manages the mappings from virtual to logical and from logical to physical devices. The tables that describe this mapping are updated, maintained, backed up and occasionally recovered by this functional software on processor 204-0. The free space collection function is also performed by processor 204-0 as well as management and scheduling of the optical fiber backend channels 104. Many of these above functions are well known in the data processing art and are not described in any detail herein.

Dynamic Virtual Device to Logical Device Mapping

With respect to data transfer operations, all data transfers go through cache memory 113. Therefore, front end or channel transfer operations are completely independent of backend or device transfer operations In this system, staging operations are similar to staging in other cached disk subsystems but destaging transfers are collected together into groups for bulk transfers. In addition, this data storage subsystem 100 simultaneously performs free space collection, mapping table backup, and error recovery as background processes. Because of the complete front end/backend separation, the data storage subsystem 100 is liberated from the exacting processor timing dependencies of previous count key data disk subsystems. The subsystem is free to dedicate its processing resources to increasing performance through more intelligent scheduling and data transfer control.

The parallel disk drive array data storage subsystem 100 consists of three abstract layers: virtual, logical and physical. The virtual layer functions as a conventional large form factor disk drive memory. The logical layer functions as an array of storage units that are grouped into a plurality of redundancy groups (ex 122-1 to 122-n+m), each containing N+M disk drives to store N physical tracks of data and M physical tracks of redundancy information for each logical track. The physical layer functions as a plurality of individual small form factor disk drives. The data storage management system operates to effectuate the mapping of data among these abstract layers and to control the allocation and management of the actual space on the physical devices. These data storage management functions are performed in a manner that renders the operation of the parallel disk drive array data storage subsystem 100 transparent to the host processors (11-12).

A redundancy group consists of N+M disk drives. The redundancy group is also called a logical volume or a logical device. Within each logical device there are a plurality of logical tracks, each of which is the set of all physical tracks in the redundancy group which have the same physical track address. These logical tracks are also organized into logical cylinders, each of which is the collection of all logical tracks within a redundancy group which can be accessed at a common logical actuator position. A parallel disk drive array data storage subsystem 100 appears to the host processor to be a collection of large form factor disk drives, each of which contains a predetermined number of tracks of a predetermined size called a virtual track. Therefore, when the host processor 11 transmits data over the data channel 21 to the data storage subsystem 100, the data is transmitted in the form of the individual records of a virtual track. In order to render the operation of the parallel disk drive array data storage subsystem 100 transparent to the host processor 11, the received data is stored on the actual physical disk drives (122-1 to 122-n+m) in the form of virtual track instances which reflect the capacity of a track on the large form factor disk drive that is emulated by data storage subsystem 100. Although a virtual track instance may spill over from one physical track to the next physical track, a virtual track instance is not permitted to spill over from one logical cylinder to another. This is done in order to simplify the management of the memory space.

Mapping Tables

It is necessary to accurately record the location of all data within the parallel disk drive array data storage subsystem 100 since the data received from the host processors 11-12 is mapped from its address in the virtual space to a physical location in the subsystem in a dynamic fashion. A virtual track directory is maintained to recall the location of the current instance of each virtual track in the parallel disk drive array data storage subsystem 100. The virtual track directory consists of an entry for each virtual track which the associated host processor 11 can address. The entry contains the logical sector address at which the virtual track instance begins. The virtual track directory entry also contains data indicative of the length of the virtual track instance in sectors. The virtual track directory is stored in noncontiguous pieces of the cache memory 113 and is addressed indirectly through pointers in a virtual device table. The virtual track directory is updated whenever a new virtual track instance is written to the disk drives.

The storage control also includes a free space directory which is a list of all of the logical cylinders in the parallel disk drive array data storage subsystem 100 ordered by logical device. Each logical device is cataloged in a list called a free space list for the logical device; each list entry represents a logical cylinder and indicates the amount of free space that this logical cylinder presently contains. This free space directory contains a positional entry for each logical cylinder; each entry includes both forward and backward pointers for the doubly linked free space list for its logical device and the number of free sectors contained in the logical cylinder. Each of these pointers points either to another entry in the free space list for its logical device or is null. The collection of free space is a background process that is implemented in the parallel disk drive array data storage subsystem 100. The free space collection process makes use of the logical cylinder directory which is a list contained in the first sector of each logical cylinder indicative of the contents of that logical cylinder. The logical cylinder directory contains an entry for each virtual track instance contained within the logical cylinder. The entry for each virtual track instance contains the identifier of the virtual track instance and the identifier of the relative sector within the logical cylinder in which the virtual track instance begins. From this directory and the virtual track directory, the free space collection process can determine which virtual track instances are still current in this logical cylinder and therefore need to be moved to another location to make the logical cylinder available for writing new data.

Virtual Track Directory

Figure 4:
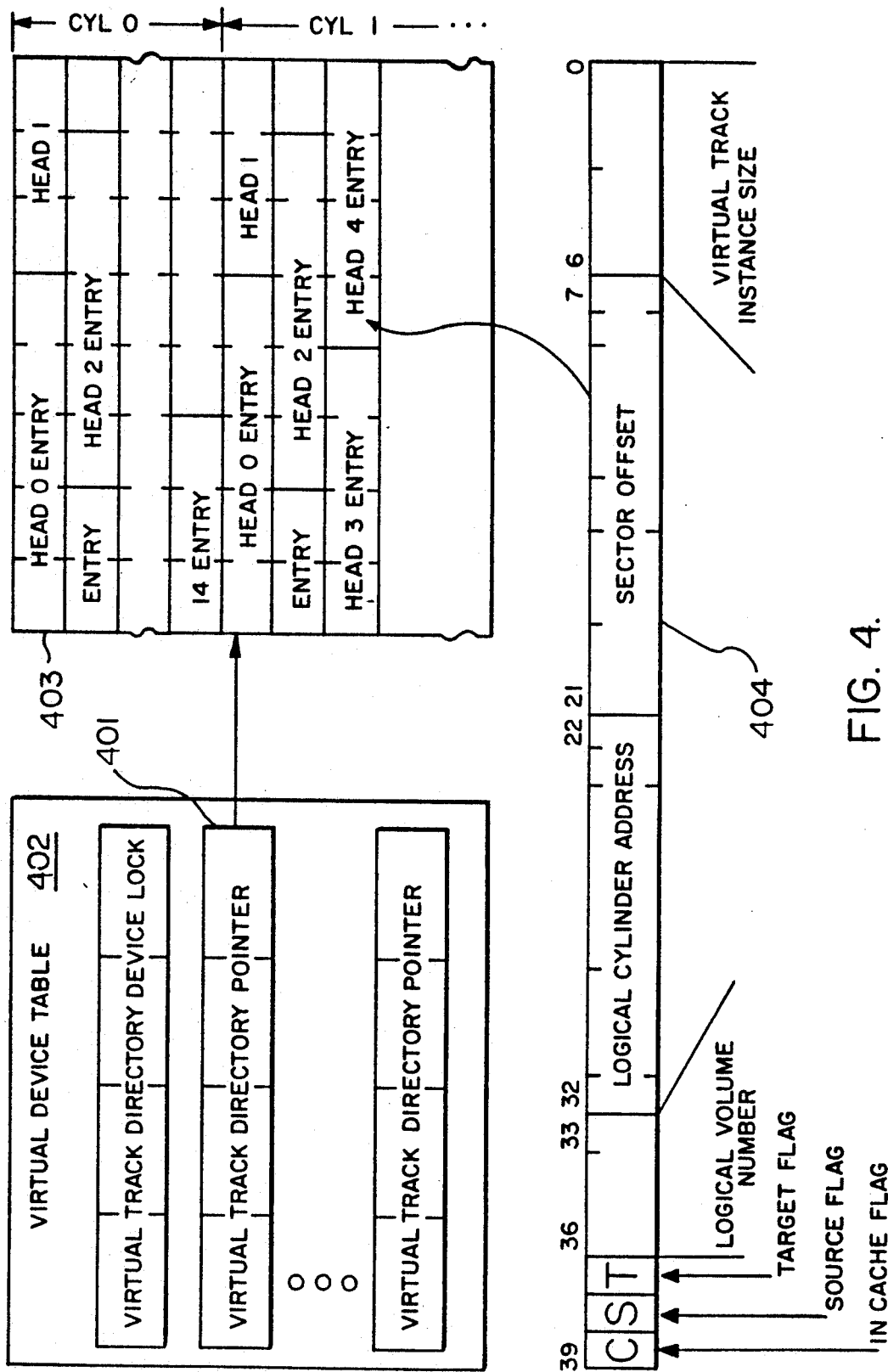
FIG. 4 illustrates the typical format of the virtual track directory.

FIG. 4 illustrates the format of the virtual track directory that is contained within cache memory 113. The virtual track directory consists of the tables that map the virtual addresses as presented by host processor 11 to the logical drive addresses that is used by control unit 101. There is another mapping that takes place within control unit 101 and this is the logical to physical mapping to translate the logical address defined by the virtual track directory into the exact physical location of the particular disk drive that contains the data identified by the host processor 11. The virtual track directory is made up of two parts: the virtual track directory pointers in the virtual device table and the virtual track directory itself. The virtual track directory is not contiguous in cache memory 113 but is scattered about the physical extent of cache memory 113 in predefined length segments. Each segment has a virtual to logical mapping for a predetermined number of cylinders, for example 102 cylinders worth of IBM 3380 type DASD tracks. In the virtual device table, there are pointers to as many of these segments as needed to emulate the number of cylinders configured for each of the virtual devices defined by host processor 11. The virtual track directory is built by control unit 101 at the time the virtual device is configured. When a virtual volume is configured, the number of cylinders in that volume is defined by the host processor 11. A segment or a plurality of segments of volatile cache memory 113 are allocated to this virtual volume defined by host processor 11 and the virtual device table is updated with the pointers to identify these segments contained within cache memory 113. Each segment is initialized with null pointers to indicate that the virtual tracks contained on this virtual volume have not yet been written. Each entry in the virtual track directory is for a single virtual track and is addressed by the virtual track address. As shown in FIG. 4, each entry is 40 bits long. The entry contents are as follows starting with the high order bits:

| | |
|---|---|
| Bits 39-37: | These bits are reserved for future use. |
| Bits 36-33: | Logical volume number. This entry corresponds to the logical volume table described above. |
| Bits 32-22: | Logical cylinder address. This data entry is identical to the physical cylinder number. |
| Bits 21-7: | Sector offset. This entry is the offset to the start of the virtual track instance in the logical cylinder, not including the redundancy track sectors. These sectors typically contain 512 bytes. |
| Bits 6-0: | Virtual Track Instance Size. This entry notes the number of sectors that are required to store this virtual track instance. |

Data Compression Capabilities

Data stored on disks and tapes or transferred over communication links in a computer system generally contains significant redundancy. Data compression algorithms improve the efficiency with which data is stored or transmitted by reducing the amount of redundant data. A compression algorithm takes a source text as input and produces a corresponding compressed text. An expansion algorithm takes the compressed text as input and produces the original source text as an output. There are four types of redundancy that are typically found in a data file. The first type of redundancy is character distribution redundancy. In a typical character string, some characters are used more frequently than others. Specifically, the eight bit ASCII representations used to encode characters are not all used in a typical character string. Nearly three fourths of the possible 256 characters representations may not be used in a specific file. Consequently, nearly two bits of each eight bit representation could be removed without affecting the data content of the character string. This is a twenty-five percent savings in space and encoding time. The second type of redundancy is character repetition redundancy. When a string of repetitions of a single character occurs, the message can be encoded more compactly than by just repeating the character symbol. The character repetition strings are infrequent in text but fairly common in formatted business files where unused space is very common. In addition, graphical images contain a significant amount of character repetition redundancy. A third form of redundancy consists of high usage patterns. Certain sequences of characters appear with relatively high frequency in a particular data file and therefore can be represented with relatively fewer bits for a net savings in data storage space and string encoding time. Thus, frequently occurring patterns are encoded using fewer bits while infrequently occurring patterns are encoded using more bits. The fourth type of redundancy is positional redundancy. If certain characters appear consistently at a predictable place in each block of data, then the characters are at least partially redundant. An example of positional redundancy are charts and pictures.

The most popular method of data compression is Huffman type coding which translates fixed sized pieces of input data into variable length symbols. The Huffman encoding procedure assigns codes to input symbols such that each code length is proportional to the probability of the symbol occurring in the data. In normal use, the size of the input symbols is limited by the size of the translation table needed for compression. That is, a table is needed that lists each input symbol and its corresponding code. A second problem with Huffman encoding is the complexity of the decompression process. The length of each code to be interpreted for decompression is not known until the first few bits are interpreted. An improvement over Huffman coding is an adaptive compression algorithm such as the Lempel-Ziv category of algorithms that converts variable length strings of input symbols into fixed length codes. This form of data compression is effective at exploiting character frequency redundancy, character repetition redundancy, and high usage pattern redundancy but is not generally effective on positional redundancy. This algorithm is adaptive in the sense that it starts each field with an empty table of symbol strings and builds the table during both the compression and decompression processes. These are one PASS procedures that require no prior information about the input data statistics and execute in time proportional to the length of the message.

The length of a compressed image for a given message is unpredictable because it depends on the content of the message. There is no assurance prior to data compression that a message will compress at all; in some cases it may even expand. Therefore, the space allocated for the compressed image must be at least as big as the space allocated for the original message. In addition, an update to a data record that alters just a few characters of the data record can change the compressed size and may result in a required change in allocation even for a minor update. Therefore, the above-described process used by data storage subsystem 100 to perform modifications to data records overcomes this minor update impact on compressed data, since a modified data record is always written to an empty logical cylinder and the old version of the data record is flagged as obsolete.

Data Compaction

As a data record is received from host processor 11 by channel interface control 202-0, and buffered therein, processor 204-0 deletes all gaps between fields in the received count key data record. The virtual device and virtual cylinder addresses are extracted from the count key data format data record and used to create an entry in the virtual cylinder directory stored in cache memory 113. The data fields of the received data record are forwarded to channel data compression circuit 203-0 for compression and temporary storage in cache memory 113. Thus, all that is stored in the redundancy groups are logical cylinders of compressed data in fixed block architecture format since the headers, gaps and received space in the received count key data are deleted. A further compaction process is the creation of null virtual tracks. Each time host processor 11 creates a new instance of a data file, a predetermined data file extent is reserved by host processor 11. Channel interface control 202-0 and processor 204-0 eliminate the need to reserve this unused memory space by simply creating a series of null entries in the virtual track directory; no data is written to a redundancy group.

Adaptive Data Compression Function

The adaptive data compression apparatus 203-0 is located within control unit 101, which is interposed between a plurality of host processor channel interface units 201 and cache memory 113. The adaptive data compression apparatus 203-0 functions to efficiently compress the records of a user data file received from the host processor 11 into a bit oriented compressed format for storage in cache memory 113 and disk drives 122. The data compression apparatus 203-0 divides each record of an incoming stream of data records into predetermined sized segments, each of which is compressed independently without reference to any other segment in the stream of data records. The data compression apparatus 203-0 concurrently uses a plurality of data compression algorithms to adapt the data compression operation to the particular data stored in the user data record. A cyclic redundancy check circuit is used to compute a predetermined length CRC code from all of the incoming user data bytes before they are compressed. The computed CRC code is appended to the end of the compressed data block.

The data compression apparatus 203-0 operates by converting bytes and strings of bytes into shorter bit string codes called reference values. The reference values replace the bytes and strings of bytes when recorded on the disk drives 122. The byte strings have two forms, a run length form for characters that are repeated three or more times, and a string form that recognizes character patterns of two or more characters. Two variables are used to indicate the maximum and minimum byte values in a particular segment.

Strings of two or more bytes are compressed by assigning a reference value to each defined string using an adaptive data compression algorithm. Subsequent occurrences of that string are replaced by its string reference value. Strings are constructed a character at a time, where a previously defined string plus the next user data byte defines a new string and is assigned the next previously undefined reference value. Thus, strings become longer and data compression more efficient as more user data bytes in the segment are examined.

However, as more strings are defined, greater length reference values are needed to uniquely identify a string, reducing the efficiency of the compression process. This factor makes it desirable to divide a data record into segments which are compressed independently. String definition occurs by combining the last used reference value with the next user data byte from the input data stream, then searching to see if this string has been previously defined. If it has, the next byte is concatenated to this new byte string reference value and a search is again conducted to see if this extended byte string has been previously defined as a string. This sequence is continued until a string is located that has not been previously defined. The last used defined string reference value is put in the compressed output data stream and the next previously undefined reference value is assigned to define the last string that was not found. The search procedure is initiated over again starting with the most recently used user data byte.

Runs of three or more repeated bytes are encoded using a predetermined set of reserved reference values to indicate that the preceding character was repeated the number of times specified by the repeat code. The immediately preceding character is not re-included in the repeat count. Run length encoding takes precedence over string data compression. Run length encoding, single byte compression, and string data compression are intermixed in any compressed segment within the user data record.

If the size of a compressed segment in bytes is larger than its size before compression then the segment is not compressed and is recorded in uncompressed format.

Data Compression Apparatus Architecture

Figure 3:
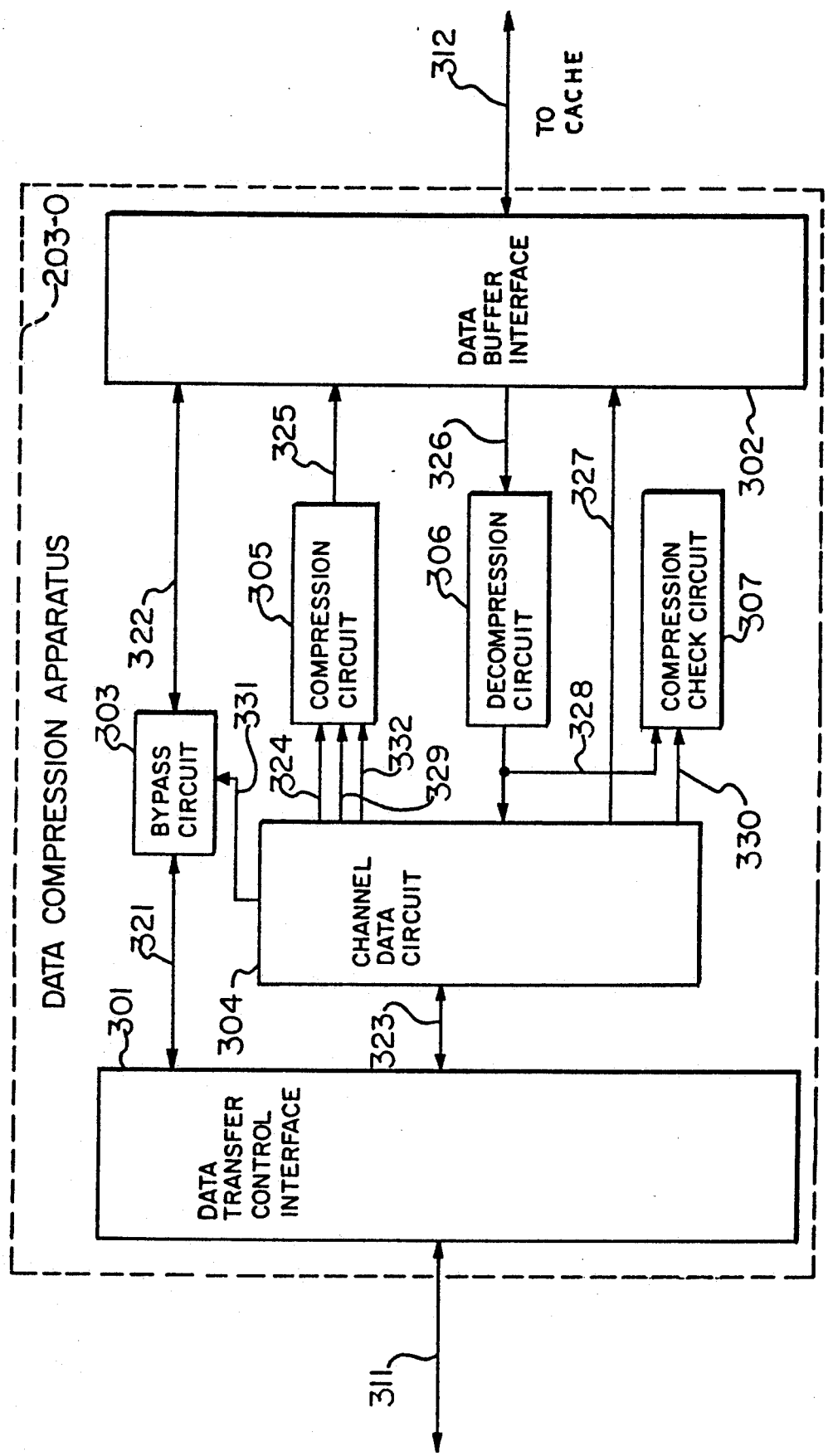
FIG. 3 illustrates additional details of the data compression circuit.

FIG. 3 illustrates the adaptive data compression apparatus 203-0 in block diagram form. The data compression apparatus 203-0 receives user data via bus 311 during a data record write operation. Data compression apparatus 203-0 transforms the received user data into a new bit oriented compressed format. The compressed data is then transmitted over bus 312 to cache memory 113 for writing into an empty logical cylinder in a selected redundancy group. During a read operation, data compression apparatus 203-0 receives the compressed data from cache memory 113 and decompresses this data. The decompressed data now represents the original user data as originally received from the host processor 11. This reconstituted user data is then transmitted over bus 311 to channel interface control 202-0. The start of the transfer of the user data to the channel interface control 202-0 can begin before the entire record has been decompressed. The circuitry contained in data compression apparatus 203-0 performs the above described character/string encoding/decoding and run length encoding/decoding.

Interconnection of the data compression apparatus 203-0 to channel interface unit 202-0 via bus 311 is accomplished through data transfer control interface 301. Interconnection of the data compression apparatus 203-0 to cache memory 113 is accomplished by data buffer interface 302. These two interfaces 301, 302 serve to store data received via the associated buses 311, 312 for processing by the data compression apparatus 203-0. Interfaces 301, 302 when accomplishing this interconnect function, switchably interconnect various ones of signal leads 321-323, 325-327 with the buffers contained in the respective interface circuits 301, 302 that contain the data.

The channel data circuit 304 contains all of the logic, registers and memory devices needed to control the data flow for read and write operations to the data transfer control interface 301. The flow of data through the data compression apparatus 203-0 has seven different transfer modes. These modes are:
1. Data transfer control interface 301 to data buffer interface 302.
2. Channel data circuit 304 to compression circuit 305.
3. Channel data circuit 304 to data buffer interface 302.
4. Channel data circuit 304 to compression check circuit 307.
5. Decompression circuit 306 to compression check circuit 307.
6. Channel data circuit 304 to data transfer control interface 301.
7. Decompression circuit 306 to channel data circuit 304.

All data compression is performed in compression circuit 305. The compression circuit 305 operates only during a data write operation from the channel interface control 202-0 to cache memory 113. The algorithm used for data compression is a combination of run length encoding and a bit oriented coding format as described below.

The decompression circuit 306 decompresses (expands) the compressed data received by data buffer interface 302 from the associated cache memory 113. All data decompression is performed by decompression circuit 306. Decompression circuit 306 is used both during a read and a write operation. During a read operation, the compressed data is received by the data buffer interface 302 from cache memory 113 via bus 312. The compressed data is then decompressed in decompression circuit 306 and transmitted to channel data circuit 304. Channel data circuit 304 forwards the decompressed data to data transfer control interface 301 which forwards the data to the interface channel control 202-0 via bus 311. During a data write operation to cache memory 113, the compressed data is received by decompression circuit 306 from compression circuit 305 via the data buffer interface 302. This compressed data is then decompressed by decompression circuit 306 and compared with the original uncompressed user data that is still stored in the channel data circuit 304. This compression check operation insures that the compression function performs accurately.

Bypass circuit 303 functions to bypass the entire data compression/decompression apparatus. During a bypass operation, channel data circuit 304 enables bypass circuit 303 via lead 331 to directly transfer count and key between the data transfer control interface 301 and the data buffer interface 302.

Data Compression Algorithm

Data compression is accomplished by transforming the user data field that is transmitted to data compression circuit 203-0 by the host computer 11 into a bit oriented compressed format. The compressed data field is recorded in the user bytes of a recorded data field in cache memory 113.

The user data bytes in each received user data field are divided into n segments, wherein each segment is of a predetermined equal size. The data compression algorithm processes one segment at a time to compress the data contained therein. The last segment is the residual segment and contains any residual user data bytes. A six byte cyclical redundancy check value is appended to the compressed data block following the residual segment. Each segment other than the residual segment contains the same amount of data as all the other segments in the data field before compression. The amount of compressed data recorded on the disk drives per segment is typically much less than the original amount of data contained in the segment, depending on the effectiveness of the compression algorithm on this particular user data. Each data field is compressed independently without reference to any other data field. The data compression is accomplished by converting bytes and strings of bytes into shorter bit string codes called reference values. The reference values replace the bytes and strings of bytes when recorded on disk drive memory. The byte strings have two forms, a run length form for characters that are repeated three or more times and a string form that recognizes character patterns of one or more characters.

String Compression

Strings of bytes are compressed by using an adaptive data compression algorithm which assigns a reference value to each defined string. Subsequent occurrences of that string are replaced by its string reference value. These strings are built a character at a time, that is a previously defined string plus the next user data byte shall define a new string and is assigned the next previously undefined reference value. Thus, strings become longer and data compression more efficient as more user data bytes in the segment are examined. In operation, string definition occurs by combining the last used reference value with the next user data byte from the input data stream. This resultant string is then used to search the string table to determine whether this string has previously been defined. If it has, the next subsequent data byte is concatenated to the reference value of the string which has just been found to form a new string table search pattern. The search is repeated to see if this extended byte string has been previously defined as a string. This process is iteratively continued until a string is found that has not been previously defined. Once this occurs, the last used defined string reference value is placed in the output compressed data stream and the next consecutive unused reference value is assigned to this undefined string. The search procedure is then initiated starting with the most recently received user data byte. Adaptive data compression algorithms are well known and the exact details of the present algorithm are not relevant for an understanding of the present apparatus. Therefore, the adaptive data compression algorithm is not disclosed in any further detail herein.

Runs of three or more repeated bytes are encoded by appending a repeat code to a reference value. This repeat code specifies the number of times that the last or only character of the string should be repeated. The compression algorithm therefore encodes the received byte and the run length encoding circuit maintains a count of how many of these encoded bytes are repeated sequentially in the string of received user data.

Several reference values are used and defined so that the number of bits in the repeat count field of the compressed data stream is reduced. Each run length reference value defines a range of repeat counts such that only the least significant bits of the repeat count need be written. Table A shows one example of a series of reference values which would be used if the compression segment size were 2048 bytes.

TABLE A

| Run Length Repeat Count Specification | | | |
|---|---|---|---|
| reference value | repeat code | # of bits in repeat count | byte repeat count |
| 1 | 0–1 | 1 | 2–3 |
| 2 | 0–3 | 2 | 4–7 |
| 3 | 0–7 | 3 | 8–15 |
| 4 | 0–F | 4 | 16–31 |
| 5 | 0–1F | 5 | 32–63 |
| 6 | 0–3F | 6 | 64–127 |
| 7 | 0–7F | 7 | 128–255 |
| 8 | 0–FF | 8 | 256–511 |
| 9 | 0–1FF | 9 | 512–1023 |
| 10 | 0–3FF | 10 | 1024–2047 |

Note:
The repeat code is expressed in hexadecimal form.

Compressed Data Record Format

As a data record is received from host processor 11 by channel interface control 202-0, and buffered therein, processor 204-0 deletes all gaps between fields in the received count key data record. The virtual device and virtual cylinder and head addresses previously received from the data channel are used to select an entry in the virtual track directory stored in cache memory 113. The data fields of the received data record are then forwarded to channel data compression circuit 203-0 for compression and temporary storage in cache memory 113. Thus, all that is stored in the redundancy groups are logical cylinders of compressed data in fixed block architecture format since the headers, gaps and reserved space in the received count key data are deleted. A further compaction process is the creation of null virtual tracks. Each time host processor 11 creates a new instance of a data file, a predetermined data file extent is reserved by host processor 11. Channel interface control 202-0 and processor 204-0 eliminate the need to reserve this unused memory space by simply creating a series of null entries in the virtual track directory; and no data is written to a redundancy group.

What is recorded in the data portions of the FBA sectors is either a 3380 virtual track instance (a type 0 object stored on the magnetic DASD; or a 3390 virtual track instance (a type 1 object stored on the magnetic DASD) other object types are not yet defined), consisting of the output defined by the following program:

```
begin 3380 virtual track instance;
a virtual track instance indentifier, consisting of:
        2 bits - object type 0 = 3380 virtual track
                instance
        1 bit - regular track flag
        1 bit - compressed track flag
        4 bits - virtual head number
        7 bits - length of the virtual track instance
                in minimum sectors (512 byte sectors)
        2 bytes - virtual cylinder number
        1 byte - virtual device identifier
a virtual track instance descriptor, consisting of:
        7 bits - number of records on the virtual track
        1 bit - an EOF flag, indicating that the last
                record on the track is an EOF record
    if the track is regular
        then 1 byte - commonkey length for all non-EOF
                and non-R0 records
            2 bytes - common data length (uncompressed)
                for all records other than R0,
                EOF, and the last non-EOF record
                on the track
            2 bytes - data length (uncompressed) for the
                last non-EOF record on the track
    if the track is compressed
```

```
                then for each non-EOF record starting with
                        R1
                    2 bytes - compressed data length or
                              zero meaning the data field
                              is uncompressed
                    end for
                end if
        else a Home Address field, consisting of:
                    2 bytes - virtual "symbolic" cylinder
                              number
                    2 bytes   virtual "symbolic" head
number
                    1 byte  - HA Flags under host control
                            - one flag is "defective
                              track", which is not under
                              direct host control
                for each record starting with R0
                    2 bytes - virtual "symbolic" cylinder
                              number
                    2 bytes - virtual "logical" head number
                    1 byte  - virtual "symbolic" record
                              number
                    1 byte  - key length
                    2 bytes - data length (uncompressed)
                    if the track is compressed
                        then 2 bytes - compressed data length
                                       or zero meaning the data
                                       field is uncompressed
                        end if
                    end for
                end if
        for each record
            if the key length for the record is not zero
                then the key field
                    a 6-byte CRC over the key field
                end if
        end for
        for each record starting with if the track is regular
                                          then R1
                                          else R0
                                          end if
            if the track instance is compressed and the
                compressed data length field for this record
                is not zero
                then a compressed data field
                else an uncompressed data field
            end if
            a 6-byte CRC over the uncompressed image of the
                field
            a 6-byte CRC over the compressed image of the
                field
        end for
    end 3380 virtual track instance;
```

In the above program, the following terms were used and are herein defined. An EOF record is a record with both key length and data length zero. A virtual track instance is regular if it satisfies all of the following tests:
1. The HA field and all count fields specify physical CCHHR in their logical CCHHR data.
2. HA flags are normal for non-defective, non-alternate, non-FE, non-Surface Analysis tracks.
3. R0 data length is eight bytes and data content is binary zeros.
4. No record other than the last record on the track is an EOF record.
5. If any record other than R0 or the possible EOF record has a key, then all records other than R0 or EOF have keys and all of these keys are of the same length.
6. All records other than R0 and the last non-EOF record and the possible EOF record have the same data lengths.

The reason for calling same tracks regular is to save raw storage capacity, since the virtual track descriptor is smaller when a track is regular.

A virtual track instance is compressed if it was modified by a host with the data compression feature of the subsystem enabled. The compressed track flag is for use when the subsystem operates for a while without the data compression feature installed, then has this feature installed. Otherwise, it is not needed. The fact that a track instance is compressed does not mean that any of the data fields of the track instance compressed to less than their uncompressed length. A data field which was last modified prior to enabling the data compression feature but which is part of a compressed instance has its compressed data length field coded as zero. This rule is to clarify a virtual track instance which has some fields which were last written without the data compression feature and other fields which were written since the data compression feature was installed.

While a specific embodiment of this invention has been disclosed, it is expected that those skilled in the art can and will design alternate embodiments of this invention that fall within the scope of the appended claims.

We claim:

1. A dynamically mapped virtual memory system for storing count key data format data records, each of which includes a data field, for at least one data processor comprising:

a plurality of disk drives, a subset of said plurality of disk drives configured into at least two redundancy groups, each redundancy group consisting of n+m disk drives, where n and m are both positive integers, with n being greater than 1 and m being at least equal to 1;

means responsive to the receipt of a stream of count key data format data records from a data processor for compressing said data field contained in each data record in said received stream of data records using a predefined data compression process to create a compressed data record;

means for storing each said compressed data record;

means for generating m redundancy segments using a plurality of said compressed data records;

means for selecting one of said redundancy groups having available memory space for storing said compressed data records and said m redundancy segments and means for writing said compressed data records and said m redundancy segments on said n+m disk drives in said selected one redundancy group.

2. The virtual memory system of claim 1 wherein said compressing means comprises:

means for dividing said data field of each data record in said received stream of data records into at least two sections of data;

means for compressing a section of data to form a compressed data section comprising:

means, responsive to a received data byte in said section of data, for determining whether said received data byte is identical to n data bytes last received prior to said received data byte, a last byte of a string or a string data byte in said sections of data;

means, responsive to said determining means, for assigning one of a plurality of run length reference values to a data byte that is identical to said n data bytes last received prior to said received data byte, where n is a positive integer >2;

means, responsive to said determining means, for assigning one of a plurality of byte compression reference values to a data byte;

means, responsive to said determining means, for assigning one of a plurality of string compression reference values to a data byte that comprises said last byte of a data string; and means for writing said run length, byte compression and string compression reference values successively received from said data section compressing means to said storing means to form said compressed data section.

3. The virtual memory system of claim 1 further comprising:

means, responsive to a last data byte contained in said data field, for appending a cyclic redundancy check value representative of a cyclic redundancy check of said data field to said compressed data record written in said storing means.

4. The virtual memory system of claim 1 wherein said compressing means comprises:

means, responsive to the receipt of a data record having an empty data field, for disabling said storing means from storing said data record having an empty data field.

5. The virtual memory system of claim 1 wherein said compressing means comprises:

means, responsive to the receipt of a count key data format data record, for deleting said count field from said received count key data format data record.

6. The virtual memory system of claim 5 further comprising:

means, responsive to the receipt of said count key data format data record, for excerpting the key field from said received count key data format data record; and means for storing said excerpted key field and an associated pointer indicative of the location of said excerpted key field in available memory space in said selected one redundancy group.

7. The virtual memory system of claim 2, wherein said compressing means further comprises:

means for writing said at least two sections of data directly into a buffer;

means responsive to said buffer storing a last byte of a section of data, for calculating a byte length of said run length, byte compression and string compression reference values written in said storing means representative of said section of data; and means, responsive to said calculated byte length exceeding a byte length of said section of data, for expunging said run length, byte compression and string compression reference values written in said storing means representative of said section of data; and means, responsive to said expunging means, for substituting in said storing means said section of data stored in said buffer for said run length, byte compression and string compression reference values.

8. The virtual memory system of claim 1 further comprising:

means, responsive to said compressing means producing a compressed representation of the bytes of said data field in a data record, for decompressing said compressed representation of the data bytes of said at a field in said data record;

means, responsive to said decompressing means, for generating a first cyclic redundancy check value representative of a cyclic redundancy check of said compressed and decompressed data field;

means for generating a second cyclic redundancy check value representative of a cyclic redundancy check of said data field in said received data record; and means for comparing said first cyclic redundancy check value with said second cyclic redundancy check value to identify errors in said compressed data record.

9. The virtual memory system of claim 2 wherein said string reference value assignment means comprises:

means for comparing a received string of data bytes with a table containing entries representative of previously received strings of data bytes in said section of data that have been assigned a string reference value; and means, responsive to said received string of data bytes failing to match said table entries, for assigning a previously unassigned string reference value to said received string.

10. In a dynamically mapped virtual disk memory system containing a plurality of disk drives, a subset of said plurality of said disk drives configured into a plurality of redundancy groups, each redundancy group consisting of n+m disk drives, where n and m are both positive integers, with n being greater than 1 and m being at least equal to 1, and a cache memory connected to and interconnecting a host processor and said plurality of disk drives, a method of storing count key data format data records, each of which includes a data field, for said host processor comprising the steps of:

compressing, in response to the receipt of a stream of count key data format data records from said host processor, said data field contained in each data record in said received stream of data records using a predefined data compression process to create a compressed data record;

storing each said compressed data record in said cache memory;

generating m redundancy segments using a plurality of said compressed data records;

selecting one of said redundancy groups having available memory space for storing said plurality of compressed data records and said m redundancy segments; and writing said plurality of compressed data records and said m redundancy segments on said n+m disk drives in said selected one redundancy group.

11. The method of claim 10 wherein said step of compressing comprises:

dividing said data field of each data record in said received stream of data records into at least two sections of data;

compressing a section of data to form a compressed data section comprising:

determining, in response to a received data byte in said section of data, whether said received data byte is identical to n data bytes last received prior to said received data byte, a last byte of a string or a single data byte in said section of data;

assigning one of a plurality of run length reference values to a data byte that is identical to said n data bytes last received prior to said received data byte, where n is an integer >2;

assigning one of a plurality of byte compression reference values to a data byte;

assigning one of a plurality of string compression reference values to a data byte that comprises said last byte of a data string; and writing said run length, byte compression and string compression reference values successively received from said data section compressing step to said cache memory to form said compressed data section.

12. The method of claim 10 further comprising:
appending, in response to a last data byte contained in said data field, a cyclic redundancy check value representative of a cyclic redundancy check of said data field to said compressed data record written in said cache memory.

13. The method of claim 10 wherein said step of compressing further comprises:
disabling said step of storing in response to the receipt of a count key data format data record having an empty data field.

14. The method of claim 10 wherein said step of compressing comprises:
deleting, in response to a received count key data format data record, said count field from said received count key data format data record.

15. The method of claim 14 further comprising:
excerpting the key field from said received count key data format data record; and
storing said excerpted key field and an associated pointer indicative of the location of excerpted key field in said available memory space in said selected one redundancy group.

16. The method of claim 10, wherein said step of compressing includes dividing said received data record into at least two sections for data compression expansion detection, said method further comprising:
writing a received data record directly into a buffer;
calculating, in response to storing a last byte of a section of data in said cache memory, a byte length of said run length, byte compression and string compression reference values written to said cache memory representative of said section of data;
expunging, in response to said calculated byte length exceeding a byte length of said section of data, said run length, byte compression and string compression reference values written in said cache memory representative of said one section of data; and
substituting in said cache memory said section of data for said run length, byte compression and string compression reference values.

17. A dynamically mapped virtual disk memory system for storing count key data format data records, each of which includes a data field, for at least one data processor comprising:
a plurality of disk drives, a subset of said plurality of said disk drives configured into at least two redundancy groups, each redundancy group consisting of n+m disk drives, where n and m are both positive integers, with n being greater than 1 and m being at least equal to 1;
means, responsive to the receipt of a stream of count key data format data records from a data processor, for compressing said data fields contained in each data record in said received stream of data records using a predefined data compression process to create a compressed data record;
cache memory means for storing each said compressed data record;
means, responsive to the storage of n segments of compressed data records in said cache memory means, for generating m redundancy segments using said n stored segments of compressed data records;
means for selecting one of said redundancy groups having available memory space for storing said n segments of compressed data records and said m redundancy segments; and
means for writing said n segments of compressed data records and said m redundancy segments on said n+m disk drives in said selected on redundancy group.

18. The disk memory system of claim 17 wherein said compressing means comprises:
means for dividing said data field of a received count key data format data record into at least two sections of data;
means for compressing said section of data to form a compressed data section comprising:
means, responsive to a received data byte in said section of data, for determining whether said received data byte is identical to n data bytes last received prior to said received data byte, a last byte of a string or a single data byte in said one section of data;
means, responsive to said determining means, for assigning one of a plurality of run length reference values to a data byte that is identical to said n data bytes last received prior to said received data byte, where n is an integer >2;
means, responsive to said determining means, for assigning one of a plurality of byte compression reference values to a data byte;
means, responsive to said determining means, for assigning one of a plurality of string compression reference values to a data byte that comprises said last byte of a data string; and
means for writing said run length, byte compression and string compression reference values successively received from said data section compressing means to said cache memory means to form said compressed data section.

19. The disk memory system of claim 17 further comprising:
means, responsive to a last data byte of said data field, for appending a cyclic redundancy check value representative of a cyclic redundancy check of said at a field to said compressed data record written in said cache memory means.

20. The disk memory system of claim 17 wherein said compressing means comprises:
means, responsive to the receipt of a count key data format data record having an empty data field, for disabling said storing means for said received data record.

21. The disk memory system of claim 17 wherein said compressing means comprises:
means, responsive to a received count key data format data record, for deleting said count field from said received count key data format data record.

22. The disk memory system of claim 21 further comprising:
means, responsive to the receipt of said count key data format data record, for excerpting the key field from said received count key data format data record; and
means for storing said excerpted key field and an associated pointer indicative of the location of said excerpted key field in available memory space in said selected one redundancy group.

23. The disk memory system of claim 17, wherein said compressing means divides said received data record into at least two sections for data compression expansion detection, further comprising:
- means for writing a received section of data directly into a buffer memory means;
- means responsive to said buffer memory means storing a last byte of a section of data for calculating a byte length of said run length, byte compression and string compression reference values written to said buffer memory means representative of said section of data;
- means responsive to said calculated byte length exceeding a byte length of said section of data for expunging said run length, byte compression and string compression reference values written in said cache memory means representative of said section of data; and
- means, responsive to said expunging means for substituting in said cache memory means said section of data for said run length, byte compression and string compression reference values.

24. The disk memory system of claim 17 further comprising:
- means, responsive to said compressing means producing a compressed representative of said data fields contained in a data record, for decompressing said compressed representation; and
- means, responsive to said decompressing means, for comparing said decompressed compressed data fields of said data record with said data fields contained in said data record to identify errors in said compressed data fields of said data record.

25. The disk memory system of claim 18 wherein said string reference value assignment means comprises:
- means for comparing a received string of data bytes with a table containing entries representative of previously received strings of data bytes in said section of data that have been assigned a string reference value; and
- means, responsive to said received string of data bytes failing to match said table entries for assigning a previously unassigned string reference value to said received string.

26. A dynamically mapped virtual memory data storage subsystem for storing count key data format data records, each of which includes a data field, for at least one data processor which transmits a stream of said data records in said stream of data records to said data storage subsystem, comprising:
- a plurality of disk drives for storing data thereon;
- means, responsive to the receipt of a stream of count key data format data records from a data processor, for compressing each data record in said stream of data records using a predefined data compression process to create a compressed data record;
- means for translating a virtual address received from said data processor and associated with said compressed data record into a logic address indicative of a physical memory location on said disk drives for the storage of said compressed data record; and
- means for writing said compressed data record into said physical memory location on said disk drives.

27. The data storage subsystem of claim 26 wherein said compressing means comprises:
- means for dividing said data field of each data record in said received stream of data records into at least two sections of data;
- means for compressing a section of data to form a compressed data section comprising:
  - means, responsive to a received data byte in said section of data, for determining whether said data byte is identical to n data bytes last received prior to said received data byte, a last byte of a string or a single data byte in said section of data;
  - means, responsive to said determining means, for assigning one of a plurality of run length reference values to a data byte that is identical to said n data bytes last received prior to said received data byte, where n is an integer >2;
  - means, responsive to said determining means, for assigning one of a plurality of byte compression reference values to a data byte;
  - means, responsive to said determining means, for assigning one of a plurality of byte compression reference values to a data byte;
  - means, responsive to said determining means, for assigning one of a plurality of string compression reference values to a data byte that comprises said last byte of a data string; and
- means for writing each of said run length, byte compression and string compression reference values successively received from said data section compressing means into a buffer memory to form said compressed data section.

28. The data storage subsystem of claim 26 further including:
- means, responsive to a last data byte of said data field, for appending a cyclic redundancy check value representative of a cyclic redundancy check of said data field to said compressed data record.

29. The data storage subsystem of claim 26 wherein said compressing means further comprises:
- means for expunging gaps in said received count key data format data record prior to said writing means storing said data record on said disk drives.

30. The data storage subsystem of claim 26 wherein said compressing means comprises:
- means, responsive to a received count key data format data record, for deleting said count field from said received count key data format data record.

31. The data storage subsystem of claim 26 wherein said compressing means comprises:
- means, responsive to the receipt of a count key data format data record, for excerpting the key field from said received count key data format data record; and
- means for storing said excerpted key field and an associated pointer indicative of the location of said excerpted key field in available memory space in said physical memory location.

32. The data storage subsystem of claim 26, wherein said compressing means divides said received data record into at least two sections for data compression expansion detection, said apparatus further comprising:
- means for writing a section of data directly into a buffer memory;
- means, responsive to a last byte of a section of data written into said buffer memory, for calculating a byte length of said compressed data written to said storing means; and
- means, responsive to said calculated byte length exceeding a byte length of said received data record, for expunging said compressed section of data written on to said storing means and replacing it with the section of data from said buffer memory.

33. The data storage subsystem of claim 26 further comprising:
- means, responsive to said compressing means producing a compressed representation of the data bytes of said data field in a received data record, for decompressing said compressed representation of the data bytes of said data field in a received data record;
- means, responsive to said decompressing means, for generating a first cyclic redundancy check value representative of a cyclic redundancy check of said compressed and decompressed data field;
- means for generating a second cyclic redundancy check value representative of a cyclic redundancy check of said data field in said data record; and
- means for comparing said first generated cyclic redundancy check value with said second generated cyclic redundancy check value to identify errors in said compressed data section of said data record.

34. The data storage subsystem of claim 27 wherein said string reference value assignment means comprises:
- means for comparing a received string of data bytes with a table containing entries representative of previously received strings of data bytes in said section of data that have been assigned a string reference value; and
- means, responsive to said received string of data bytes failing to match said table entries, for assigning a previously unassigned string reference value to said received string.

35. A method of storing data in a dynamically mapped virtual memory data storage subsystem having a plurality of disk drives for storing count key data format data records, each of which includes a data field, for at least one data processor which transmits a stream of said data records and a virtual address associated with each data recording said stream of data records transmitted to said data storage subsystem, comprising the steps of:
- compressing, in response to the receipt of said stream of count key data format data records from a data processor, each data record in said received stream of data records using a predefined data compression process to create a compresses data record;
- translating said virtual address associated with said compressed data record into a logical address indicative of a physical memory location on said disk drives for the storage of said compressed data record; and
- storing said compressed data record in said physical memory location.

36. The method of claim 35 wherein said step of compressing comprises:
- dividing said data field of each data record in said received stream of data records into at least two sections of data;
- compressing a section of data in said data record comprising:
  - determining, in response to a received data byte in said section of data, whether said received data byte is identical to n data bytes last received prior to said received data byte, a last byte of a string or a single data byte in said section of data;
  - assigning one of a plurality of run length reference values to a data byte that is identical to n data bytes last received prior to said received data byte, where n is an integer >2;
  - assigning one of a plurality of byte compression reference values to a data byte;
  - assigning one of a plurality of string compression reference values to a data byte that comprises a last byte of a data string; and
- writing each of said run length, byte compression and string compression reference values successively compressed into a buffer memory to form said compressed data.

37. The method of claim 35 further comprising:
- appending, in response to a last data byte of said data field, a cyclic redundancy check value representative of a cyclic redundancy check of said data field to said compressed data record.

38. The method of claim 36 wherein said step of compressing comprises:
- expunging gaps in said received count key data format data record prior to storing said sections of said received data record in said physical memory location.

39. The method of claim 35 wherein said step of compressing comprises:
- deleting said count field from said count key data format data record.

40. The method of claim 35 wherein said step of compressing comprises:
- excerpting the key field from said received count key data format data record; and
- storing said excerpted key field and an associated pointer indicative of the location of said excerpted key field in available memory space in said physical memory location.

41. The method of claim 35, wherein said compressing means divides said received count key data format data record into at least two sections for data detection, said method further comprising:
- writing said received count key data format data record directly into a buffer memory;
- calculating, in response to a last byte of data written into said buffer memory, a byte length of said compressed data;
- expunging, in response to calculated said byte length exceeding a byte length of said received count key data format count key data format data record written in said buffer memory.

42. The method of claim 35 further comprising:
- decompressing, in response to said step of compressing, said compressed representation of the data bytes of said data field in a received count key data format data record;
- generating a first cyclic redundancy check value representative of a cyclic redundancy check of said compressed and decompressed data field;
- generating a second cyclic redundancy check value representative of a cyclic redundancy check of said data field in said received data record; and
- comparing said first generated cyclic redundancy check value with said second generated cyclic redundancy check value to identify errors in said compressed count key data format data record.

43. The method of claim 36 wherein said string reference value assignment comprises:
- comparing a received string of data bytes with a table containing entries representative of previously received strings of data bytes in said section of data that have been assigned a string reference value; and
- assigning, in response to said received string of data bytes failing to match said table entries, a previously unassigned string reference value to said received string.

* * * * *